(12) United States Patent
Geiss et al.

(10) Patent No.: US 7,106,855 B2
(45) Date of Patent: Sep. 12, 2006

(54) METHOD AND APPARATUS FOR CONNECTING BROADBAND VOICE AND DATA SIGNALS TO TELEPHONE SYSTEMS

(75) Inventors: Richard Geiss, Kanata (CA); Joe Lung, Kanata (CA)

(73) Assignee: 1021 Technologies KK, Yokohama (JP)

( * ) Notice: Subject to any disclaimer, the term of this patent is extended or adjusted under 35 U.S.C. 154(b) by 495 days.

(21) Appl. No.: 09/832,980

(22) Filed: Apr. 12, 2001

(65) Prior Publication Data

US 2001/0033651 A1    Oct. 25, 2001

(30) Foreign Application Priority Data

Apr. 25, 2000    (GB) ................... 0010075.0

(51) Int. Cl.
*H04M 1/00* (2006.01)
*H04M 9/00* (2006.01)

(52) U.S. Cl. ............... 379/399.01; 379/93.01; 379/93.09; 379/406.01

(58) Field of Classification Search .......... 379/390.02, 379/399.01, 413.02, 388.05, 406.01–406.16, 379/93.01, 93.09
See application file for complete search history.

(56) References Cited

U.S. PATENT DOCUMENTS

| | | | |
|---|---|---|---|
| 4,381,561 A * | 4/1983 | Treiber | 370/294 |
| 5,559,793 A | 9/1996 | Maitra et al. | 370/32.1 |
| 5,745,564 A * | 4/1998 | Meek | 379/406.08 |
| 6,212,259 B1 * | 4/2001 | Kiko | 379/32.01 |
| 6,694,019 B1 * | 2/2004 | Song | 379/406.04 |
| 6,728,367 B1 * | 4/2004 | Swam | 379/372 |
| 6,839,425 B1 * | 1/2005 | Huang | 379/399.01 |
| 2005/0031097 A1 * | 2/2005 | Rabenko et al. | 379/93.31 |

FOREIGN PATENT DOCUMENTS

| | | |
|---|---|---|
| EP | 0 194 738 A1 | 9/1986 |
| EP | 693 846 A2 | 1/1998 |
| GB | 2 102 255 A | 1/1983 |
| GB | 2 103 907 A | 2/1983 |
| GB | 2 164 529 A | 3/1986 |
| WO | WO 83/01876 | 5/1983 |
| WO | WO 97/20396 | 6/1997 |
| WO | WO 99/18701 | 4/1999 |
| WO | WO 00/14944 | 3/2000 |

OTHER PUBLICATIONS

Starr, T. et al., Understanding Digital Subscriber Line Technology, Prentice-hall, Upper Saddler River, 1999, pp. 140 to 142.

* cited by examiner

*Primary Examiner*—Matthew Anderson
*Assistant Examiner*—Tuan Pham

(57) ABSTRACT

A system for use in connecting broadband voice and data signals to communications systems such as the telephone system. Due to the low pass filtering characteristics of a standard twisted pair used in conventional telephone access loops data band signals are attenuated more than voice band signals. The present invention provides apparatus and methods for interfacing data and voice band signals to a common communications medium, such as a twisted pair, while significantly reducing the influence of one frequency band on the other.

22 Claims, 1 Drawing Sheet

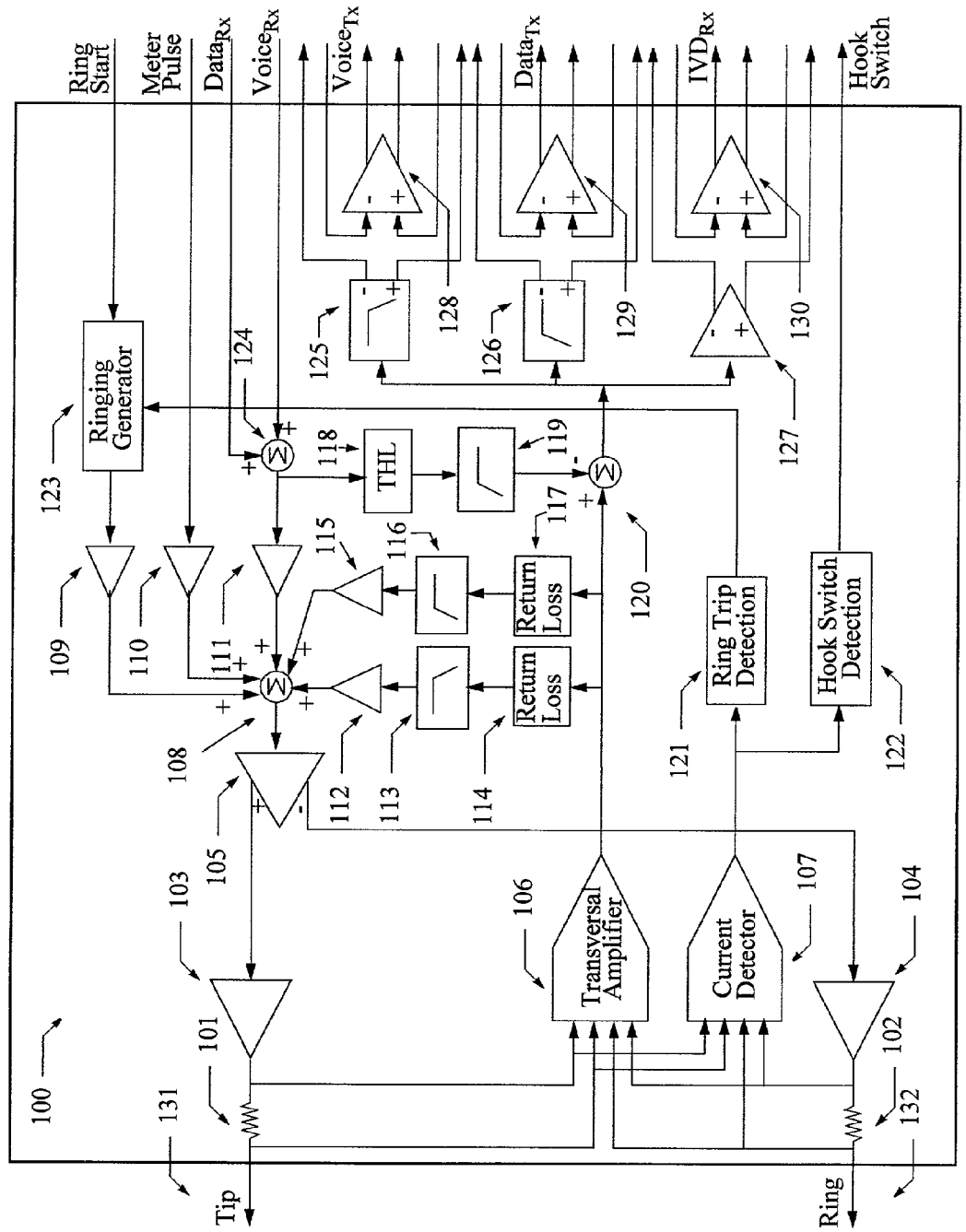
FIGURE 1. Block Diagram of Invention - Universal SLIC

METHOD AND APPARATUS FOR CONNECTING BROADBAND VOICE AND DATA SIGNALS TO TELEPHONE SYSTEMS

FIELD OF THE INVENTION

This invention relates to telecommunications and more particularly to systems and methods for use in connecting broadband voice and data signals to telephone networks.

BACKGROUND

The increasing use of the Internet and other computer based communications systems has lead to the development of systems and methods for providing higher bandwidth access over existing telephone lines. A conventional access loop from the Central Office (CO), for example, employs a twisted copper pair and transmission systems implementing technologies such as Digital Subscriber Line (DSL) have been developed to carry both voice and broadband data signal over such access loops.

Due to the low pass filtering characteristics of a standard twisted pair telephone wire, the amplitude of a received signal is attenuated more for higher frequency signals than for lower frequency signals. As a result, the received high frequency data signal is smaller in amplitude than the low frequency voice signal. In a system which contains both voice and data on the same twisted pair wire, most of the dynamic range of the signal is used by the larger (i.e. less attenuated) voice signal. Typical interface systems incorporate a circuit to separate the data band and the voice band signals directly at the line connection point and use duplicate circuitry for each separate signal band. For example, U.S. Pat. No. 6,035,029 which issued Mar. 7, 2000 to Little et al describes a system in which a network interface unit at the customer premise separates the Plain Old Telephone Signal (POTS) from the data signal and each is processed separately. Circuits of this type typically contain an expensive transformer and the duplication of components in general adds to the system cost and power requirements.

Since the voice and data signals in such systems are full duplex (i.e. both transmit and receive at the same time on the same twisted pair wire), a fraction of the transmitted signals from both the voice and data bands appears across the connection points to the twisted pair. The connection point is also known as the Tip and Ring. These unwanted signals must be removed for proper signal reception. This is typically done in a voice only system using an analog circuit which subtracts the appropriate fraction of the outgoing (fraction transmit) signal from the incoming (receive+fraction transmit) signal. The resulting signal is the receive signal alone. This is known as a transhybrid loss circuit.

In a voice only system, since the transmit fraction of the incoming signal is in the same amplitude range as the receive component of the incoming signal, the transhybrid loss circuit function can be performed digitally after the analog to digital conversion without much compromise on the dynamic range of the analog to digital converter. This can be a large problem in a system which has a high frequency data signal, since the transmit fraction of the incoming signal is much larger than the receive component of the incoming signal.

SUMMARY OF THE INVENTION

The present invention seeks to provide an interface system for connecting broadband voice and data signals to a transmission medium such as a twisted pair for bi-directional communication without the voice band signals significantly affecting the data band signals and visa versa.

The invention is suitable for, but not limited to, interfacing a DSL analog front end circuit to a subscriber line in the presence of a voice band (DC—4000 hz) signal.

Therefore in accordance with a first aspect of the present invention there is provided: a method of terminating an interface to a connection point in a communication system for communicating voice and data band signals over a common communications medium comprising: providing an analog filter in a subscriber line interface circuit to filter a voice band return loss signal and prevent voice band interference on the data band signal.

In accordance with a second aspect of the invention there is provided: a method of terminating an interface to a connection point in a communication system for communicating voice and data band signals over a common communications medium comprising: providing an analog filter in a subscriber line interface circuit to filter data band return loss and prevent data band interference on the voice band signal.

In a further aspect there is provided: a method of terminating an interface to a connection point in a communication system for communicating voice and data band signals over a common communications medium comprising, in a subscriber line interface circuit: using a first analog filter to filter a voice band return loss and prevent voice band interference on the data band signal and using a second analog filter to filter a data band return loss circuit to prevent data band interference on the voice band signal.

Still further, there is provided: a method of canceling a transhybrid component and near end echo from a data signal at an interface to a communication system for bi-directional communication of voice and data band signals over a common interface comprising, at a subscriber line interface circuit: providing an analog circuit for removing the transhybrid component and near end echo from an incoming signal; and providing an analog data band filter for preventing data band interference on the voice band signal.

Further still, there is provided: a subscriber line interface circuit for connection to a transmission medium for bi-directional communication of both voice and data signals, said termination circuit comprising; detection means to detect voice and data signals at a connection point to said transmission medium; a voice band return loss means monitoring said voice and data signals and generating a voice band return signal to be forwarded to said connection point, said return signal being a representation of said voice band signal; and a voice band filter connected to said return loss means said voice band filter isolating said voice band return loss signal from said data band signal.

Also, there is provided: a termination circuit for a subscriber line interface connected to a transmission medium for bi-directional communication of both voice and data signals, said termination circuit comprising; detection means to detect voice and data signals at a connection point to said transmission medium; a data band return loss means monitoring said voice and data signals and generating a data band return signal to be forwarded to said connection point, said data band return signal being a representation of said data band signal; and a data band filter connected to said return loss means said data band filter isolating said data band return loss signal from said voice band signal.

A termination circuit having both voice and data return loss circuits having voice band and data band filters respectively is also contemplated by the invention.

BRIEF DESCRIPTION OF THE DRAWINGS

An embodiment of the invention will now be described in greater detail with reference to the attached drawing wherein FIG. 1 is a block circuit diagram of the invention.

DETAILED DESCRIPTION OF A PREFERRED EMBODIMENT OF THE INVENTION

FIG. 1 is a block diagram illustrating at a high level the various circuits and components making up the embodiment of the invention. A line termination exists wherever something connects to a twisted pair wire. Any signal transmitted along the twisted pair wire would have a fraction of its signal reflected back to the source. This is known as a far end echo. The amount of the reflected signal is dependent on how closely the termination impedance matches the line impedance. Since a twisted pair of wire looks like different impedances for different frequencies, any termination circuit that is optimized for high frequency applications will not be optimized for voice band and vice versa. A physical termination suitable for both bands is generally not possible. A method of making a physical termination look like it has a termination impedance different than the physical impedance is to have a fraction of the signal received at the termination modified by a return loss circuit 114 and transmitted back out on the line. This modulates the line driver output impedance to make physical termination look different than without the modulation.

Typically devices used for data will have a means of canceling the resulting far end echo which is reflected back to them, but most voice band equipment does not have any means of canceling echo reflected back to it. Therefore, anyone planning to do voice transmission must match the line impedance better than someone doing just data transmission who could ignore how much far end echo they generate.

The problem is that the return loss circuitry 114 used to match a line for voice characteristics can actually interfere with the higher frequency data signal. In order to provide a good termination for the voice band without significantly affecting the data band signal, the invention uses a voice band filter 113 to isolate the effects of the modulation to the voice band. Similarly the return loss circuit 117 for the data band is limited to only affecting the data band by the data band filter 116.

Since systems requiring the presence of both voice and data over the same twisted pair wire are required to produce only small far end echo in the voice band, a circuit is required to reduce the voice band far end echo generated. Since this requirement may degrade the data band signal performance, embodiments of the invention incorporate a voice band filter 113 to minimize the impact on the data band signal. This ability to provide a circuit which reduces far end echo in the voice band but has little impact on the data band signal allows for good voice band performance as well as a simpler data band receive circuit.

Since any bi-directional transmission along a twisted pair wire contains both the transmit and receive signals, a fraction of the outgoing signal across the outputs of 103 and 104 will appear across Tip 131 and Ring 132. This is referred to as the transhybrid component. Also any mismatch in the line termination on the transmit connection to the line and the actual line will result in a fraction of the outgoing signal being reflected back and added to the incoming signal. That fraction is called the near end echo.

For voice band signals, the transmit and receive signals are approximately the same amplitude range. Therefore, the incoming signal made up of the receive signal plus the near end echo plus the transhybrid component will not be much larger than the receive signal amplitude alone. Therefore, the resolution of the analog to digital converter required to digitize the voice signal with near end echo and transhybrid component does not have to be much better than that required for the voice signal alone. The invention could perform near end echo cancellation and transhybrid component cancellation with either an analog circuit or a digital circuit after digitization. Therefore, for voice band signals this is generally not a problem.

Since the transmit signal, across the outputs of 103 and 104, for data frequency band is quite large compared with its data band receive signal across Tip 131 and Ring 132, any transhybrid component or near end echo from its transmit signal may also be much larger than its receive signal especially for long wire lengths. If an analog to digital converter is eventually required to digitize the data band receive signal, the dynamic range of the analog to digital converter will have to allow for the receive data band signal as well as the near end echo and transhybrid loss. This requires the resolution of the analog to digital converter to be much better than that required for the data band receive signal alone.

A typical solution would be to digitize the signal, using a high resolution analog to digital converter, and cancel the near end echo and transhybrid component in the digital domain. The invention uses an analog circuit 118 to perform the transhybrid component estimation and near end echo estimation and subtracts them from the incoming signal to produce a new signal which is close to just the receive signal alone. The invention uses a data band filter 119 to limit the effects of the estimations to the data frequency band. This reduces the transhybrid component and near end echo to a point where the resolution of the analog to digital converter required to digitize the incoming data band signal does not require much more resolution than that required to digitize the data band receive signal alone.

Analog to digital converters for the frequency range of the data band become very difficult to manufacture and are also very expensive for high resolution, therefore by reducing the resolution requirements of the analog to digital converter, the invention reduces overall system cost and improves manufacturability.

For any system required to deal with both voice and data over the same twisted pair wire, there will be both voice band and data band components on the incoming signal. Since the characteristics of the line produce a low pass filtering effect, the higher frequency data band signal is attenuated more than the lower frequency voice band signal. This results in the voice band receive signal having a larger amplitude than the data band receive signal.

Therefore, for a system required to receive both voice and data signals, an analog to digital converter with a resolution much better than that required if only the data band receive signal was presented to the analog to digital converter is required, due to the difference in the relative amplitudes of the voice band signal and the data band signal. This is a typical method in a system using both voice and data on the same twisted pair wire.

One way of avoiding a very high resolution analog to digital converter is to use analog filters 125 and 126 to allow for the voice band and the data band respectively to be separated. This allows for the voice band and the data band to be digitized by two separate lower resolution analog to digital converters. Since the voice band analog to digital converters are less expensive than the wide band analog to digital converters for the data band, the combined cost of a voice band analog to digital converter and a low resolution data band analog to digital converter will be less than the cost of an analog to digital converter with high enough resolution to digitize a signal containing both voice band and data band components.

A second way of avoiding a very high resolution analog to digital converter is to have the outputs of the filters 125 and 126 independently scaled and summed. This would provide a single output signal consisting of both the voice band and data band, but with the voice band and data band scaled such that they have approximately the same relative amplitudes. This allows for a single analog to digital converter to be used to digitized the voice band and the data band but without requiring the analog to digital converter to have a resolution much higher than that required for digitizing the data band signal alone.

A third way of avoiding a very high resolution analog to digital converter is by independently scaling and summing the voice band and data band signals of a system requiring both voice and data over the same twisted pair wire.

While particular embodiments of the invention have been described and illustrated it will be apparent to one skilled in the art that that numerous variations can be made to these embodiments without departing significantly from the basic concept. It is to be understood, however, that such variations will be seen to fall within the full scope of the invention as defined by the appended claims.

The invention claimed is:

1. A subscriber line interface circuit (SLIC) for connection to a transmission medium for bi-directional communication of both voice and data signals to and from said transmission medium, said SLIC comprising:
   (i) detection means (106) for detecting voice and data signals at a connection point (131, 132) to said transmission medium and providing corresponding detected voice and data signals (V+D);
   (ii) means (114) for deriving from said detected voice and data signals a voice band return loss signal (V'), analog filter means for limiting said voice band return loss signal to the voice band, and means for subtracting the filtered voice band return loss signal (V') from voice and data signals for transmission to said transmission medium via said connection point.

2. A circuit according to claim 1, wherein said transmission medium is a twisted copper pair.

3. A circuit according to claim 1, wherein said bi-directional communication is implemented utilizing a Digital Subscriber Line (DSL) scheme.

4. A circuit according to claim 1, further comprising
   (iii) transhybrid loss and near end echo cancellation means comprising an analog circuit (118) responsive to data signals to be transmitted via said connection point (131, 132) for providing estimates of a transhybrid component value and a near end echo value, an analog data band filter (119) for restricting the estimates to said data band, and means (120) for subtracting the restricted estimates from incoming signals received from said transmission medium via said connection point.

5. A circuit according to claim 4, having an analog to digital converter means for digitizing said incoming data signal after said transhybrid component and near end echo have been cancelled.

6. A circuit according to claim 5, wherein said analog to digital converter means comprises two separate analog to digital converters, the termination circuit having a voice band filter and a data band filter to receive said incoming data signal, and to separate said incoming signals into separate voice band and data band signals for processing by said separate analog to digital converters, respectively.

7. A circuit according to claim 5, having means for separating said incoming signals into separate voice band and data band signals, independently scaling the voice band signal and said data band signal and adding the scaled signals prior to processing by said analog to digital converter.

8. A circuit according to claim 5, having a voice band filter and a data band filter to receive said incoming signal, and to separate said incoming signal into separate voice band and data band signals, scaling means to scale each of said separated voice and data signals, and means to add said scaled voice and data band signals into a combined signal prior to processing by said analog to digital converter.

9. A subscriber line interface circuit (SLIC) for connection to a transmission medium for bi-directional communication of both voice and data signals, to and from said transmission medium, said SLIC comprising:
   (i) detection means (106) for detecting voice and data signals at a connection point (131, 132) to said transmission medium and providing corresponding detected voice and data signals; and
   (ii) means (117) for deriving from said detected voice and data signals a data band return loss signal, analog filter means (115) for limiting said data band return loss signal to the data band, and means (108) for subtracting said data band return loss signal from voice and data signals for transmission to said transmission medium via said connection point.

10. A termination circuit according to claim 9, further comprising
   (iii) transhybrid loss and near end echo cancellation means comprising an analog circuit (118) responsive to data signals to be transmitted via said connection point (131, 132) for providing estimates of a transhybrid loss component value and a near end echo value, an analog data band filter (119) for restricting the estimates to said data band, and means (120) for subtracting the restricted estimates from incoming signals received from said transmission medium via said connection point.

11. A subscriber line interface circuit (SLIC) for connection to a transmission medium for bi-directional communication of both voice and data signals to and from said transmission medium, said circuit comprising:
   (i) detection means (106) for detecting voice and data signals at a connection point (131, 132) to said transmission medium and providing corresponding detected voice and data signals (V+D);
   (ii) means responsive to said detected voice and data signals for providing a voice band return loss signal and a data band return loss signal, respectively, analog filter means for limiting said data band return loss signal and voice band return loss signal to the data band and the voice band, respectively, and means for subtracting the voice band return loss signal and data band return loss signal from voice and data signals for transmission to said transmission medium via said connection point.

12. A termination circuit according to claim 11, further comprising (iii) transhybrid loss and near end echo cancellation means comprising an analog circuit (118) responsive to data signals to be transmitted to said transmission medium via said connection point (131, 132) for estimating a transhybrid loss component value and a near end echo value, an analog data band filter (119) for restricting the estimates to said data band, and means (120) for subtracting the restricted estimates from incoming signals received from said transmission medium via said connection point.

13. A method of terminating a subscriber line interface connected to a transmission medium for bi-directional communication of both voice and data signals, comprising the steps of:
(i) detecting voice and data signals at a connection point (131, 132) to said transmission medium and providing corresponding detected voice and data signals;
(ii) deriving from said detected voice and data signals a voice band return loss signal, using analog filter means, filtering to limit said voice band return loss signal to the voice band, and subtracting the filtered voice band return loss signal from voice and data signals for transmission to said transmission medium via said connection point.

14. A method according to claim 13, further comprising the step of
(iii) cancelling transhybrid loss and near end echo by deriving from data signals to be transmitted via said connection point (131, 132) estimates of a transhybrid loss component value and a near end echo value, and, using analog filtering, limiting the estimates to said data band, and subtracting the restricted estimates from data signals received from said transmission medium via said connection point.

15. A method of terminating a subscriber line interface connected to a transmission medium for bi-directional communication of both voice and data signals, comprising the steps of:
(i) detecting voice and data signals at a connection point (131, 132) to said transmission medium and providing corresponding detected voice and data signals; and
(ii) deriving from said detected voice and data signals a data band return loss signal, using analog filter means, filtering to limit said data band return loss signal to the data band, and subtracting the filtered data band return loss signal from voice and data signals for transmission to said transmission medium via said connection point.

16. A method according to claim 15, further comprising
(iii) cancelling transhybrid loss and near end echo by deriving from data signals to be transmitted via said connection point (131, 132) estimates of a transhybrid loss component value and a near end echo value, and, using analog filtering, limiting the estimates to said data band, and subtracting the restricted estimates from data signals received from said transmission medium via said connection point.

17. A method of terminating a subscriber line interface connected to a transmission medium for bi-directional communication of both voice and data signals, comprising the steps of:
(i) detecting voice and data signals at a connection point (131, 132) to said transmission medium and providing corresponding detected voice and data signals;
(ii) deriving from said detected voice and data signals a voice band return loss signal and a data band return loss signal, using analog filter means, filtering to limit said voice band return loss signal to the voice band and said data band return loss signal to the data band, and subtracting the filtered voice band return loss signal and the data band return loss signal from voice and data signals for transmission to said transmission medium via said connection point.

18. A method according to claim 17, further comprising
(iii) cancelling transhybrid loss and near end echo by deriving from data signals to be transmitted via said connection point (131, 132) estimates of a transhybrid loss component value and a near end echo value, and, using analog filtering, limiting the estimates to said data band, and subtracting the restricted estimates from data signals received from said transmission medium via said connection point.

19. The method of claim 18, further comprising the step of providing an analog to digital converter for digitizing said voice and data band signals after said transhybrid component and near end echo have been cancelled.

20. The method of claim 19, wherein said incoming signal after cancellation of transhybrid components and near end echo is separated into voice band and data band signals utilizing a voice band filter and a data band filter, respectively, and digitized by separate analog to digital converters.

21. The method of claim 19, wherein said incoming signal after cancellation of transhybrid components and near end echo is separated into voice band and data band signals, scaled as separate signals, added together to form a composite signal and digitized in an analog to digital converter.

22. The method of claim 19, wherein said incoming signal after cancellation of transhybrid components and near end echo is separated into voice band and data band signals utilizing a voice band filter and a data band filter, respectively, said separate signals being scaled and added together as a scaled composite signal and digitized by an analog to digital converter.

* * * * *